US010582806B2

(12) United States Patent
Casey et al.

(10) Patent No.: US 10,582,806 B2
(45) Date of Patent: Mar. 10, 2020

(54) PRESSURE ASSIST FEATURE FOR PRESSURE FRYER

(71) Applicant: Henny Penny Corporation, Eaton, OH (US)

(72) Inventors: William M. Casey, Kettering, OH (US); Ben Krupp, Mason, OH (US); Bradley Loase, Dayton, OH (US); David B. Winter, Eaton, OH (US); Gary L. Mercer, Eaton, OH (US); Tim A. Landwehr, West Alexandria, OH (US); Keith Lambert, Springboro, OH (US)

(73) Assignee: Henny Penny Corporation, Eaton, OH (US)

( * ) Notice: Subject to any disclaimer, the term of this patent is extended or adjusted under 35 U.S.C. 154(b) by 295 days.

(21) Appl. No.: 15/411,291

(22) Filed: Jan. 20, 2017

(65) Prior Publication Data

US 2017/0127883 A1    May 11, 2017

Related U.S. Application Data

(63) Continuation-in-part of application No. 14/077,930, filed on Nov. 12, 2013, now Pat. No. 9,814,355.

(Continued)

(51) Int. Cl.
*A47J 37/12* (2006.01)

(52) U.S. Cl.
CPC ....... *A47J 37/1266* (2013.01); *A47J 37/1276* (2013.01)

(58) Field of Classification Search
CPC . A47J 37/1266; A47J 37/1223; A47J 37/1276

(Continued)

(56) References Cited

U.S. PATENT DOCUMENTS 2,308,603 A * 1/1943 Graham .............. A47J 27/0802
                                                  219/431
2,357,634 A * 9/1944 Crites .................... A47J 27/04
                                                  126/377.1

(Continued)

FOREIGN PATENT DOCUMENTS

| CA | 771120 A | 11/1967 |
|---|---|---|
| JP | H0690679 A | 4/1994 |
| KR | 20110026878 A | 3/2011 |

OTHER PUBLICATIONS

European Patent Office, European Search Report cited in EP Appl. No. 14862245.9-1656 dated Sep. 5, 2017 (9 pages).

(Continued)

*Primary Examiner* — Jimmy Chou
(74) *Attorney, Agent, or Firm* — Wood Herron & Evans LLP

(57) ABSTRACT

Systems and methods for adjusting the pressure in a cooking chamber of a pressure fryer. The pressure inside the cooking chamber is determined in response to detecting closure of a valve that vents the cooking chamber. The pressure in the chamber is compared to a predetermined pressure. If the pressure in the chamber is less than the predetermined pressure, a pressure assist system is activated. The pressure assist system includes an air pump and/or pressure source, and when activated, supplies a gas to the cooking chamber to increase the pressure in the cooking chamber. The pressure may be determined at a predetermined time after closure of the valve, and an amount of gas to be added to the cooking chamber determined based on a difference between the measured pressure and the predetermined pressure. Use of the pressure assist system allows for optimal cooking of batches of food of many sizes.

11 Claims, 7 Drawing Sheets

Related U.S. Application Data

(60) Provisional application No. 62/281,503, filed on Jan. 21, 2016.

(58) Field of Classification Search
USPC ......... 99/325, 330, 337, 338, 403, 404, 405, 99/406, 407, 408, 409, 410, 411, 412, 99/413, 414, 415, 416, 417, 418, 468, 99/473
See application file for complete search history.

(56) References Cited

U.S. PATENT DOCUMENTS

| | | | | |
|---|---|---|---|---|
| 2,369,932 A | * | 2/1945 | Allen | A47J 27/0802 200/38 R |
| 2,483,628 A | * | 10/1949 | Davis | A47J 27/0802 219/431 |
| 2,515,879 A | * | 7/1950 | Korn | A47J 27/0802 200/81.8 |
| 2,626,560 A | * | 1/1953 | Burkhardt | A47J 31/30 220/203.27 |
| 2,917,200 A | * | 12/1959 | Phelan | A47J 27/092 220/316 |
| 2,938,648 A | * | 5/1960 | Phelan | A47J 27/0817 220/316 |
| 2,942,753 A | * | 6/1960 | Kelton | A47J 27/0817 220/203.29 |
| 3,071,063 A | * | 1/1963 | Churley | A47J 27/0817 220/244 |
| 3,167,435 A | * | 1/1965 | Hall | A47J 37/1223 210/167.28 |
| 3,187,664 A | * | 6/1965 | Jennings | A47J 27/0802 126/374.1 |
| 3,194,662 A | * | 7/1965 | Nelson | A47J 27/0817 219/431 |
| 3,245,800 A | * | 4/1966 | Sanders | A47J 27/08 426/296 |
| 3,280,722 A | * | 10/1966 | Rahauser | A47J 27/0817 210/304 |
| 3,431,834 A | * | 3/1969 | Mainers | A47J 27/0817 99/330 |
| D218,498 S | * | 8/1970 | Wilson | D7/339 |
| 3,608,472 A | | 9/1971 | Pelster et al. | |
| 3,610,133 A | | 10/1971 | Mies, Jr. et al. | |
| 3,649,290 A | | 3/1972 | Angold | |
| 3,733,998 A | * | 5/1973 | Vischer, Jr. | A47J 27/0817 99/330 |
| 3,816,703 A | * | 6/1974 | Binks | A22C 21/00 126/389.1 |
| 3,821,925 A | | 7/1974 | Moore | |
| 3,951,131 A | * | 4/1976 | Houfek | A47J 27/16 126/369 |
| 3,973,481 A | | 8/1976 | Mies | |
| 3,976,218 A | * | 8/1976 | Stoermer | A47J 27/092 220/316 |
| 4,246,955 A | * | 1/1981 | Skala | A47J 27/16 165/104.14 |
| D263,305 S | * | 3/1982 | Barnhill | D7/347 |
| 4,636,949 A | | 1/1987 | Longabaugh | |
| 4,686,896 A | | 8/1987 | Gordon | |
| 4,785,725 A | * | 11/1988 | Tate | A47J 37/1228 169/23 |
| 4,911,068 A | | 3/1990 | Koether et al. | |
| 4,930,408 A | * | 6/1990 | King | A47J 27/0817 99/337 |
| 4,941,400 A | * | 7/1990 | Moore | A47J 27/0817 126/299 R |
| 4,968,516 A | * | 11/1990 | Thompson | A47J 27/0817 426/233 |
| D335,420 S | * | 5/1993 | Moore | D7/339 |
| 5,243,898 A | | 9/1993 | Sakuma | |
| 5,402,712 A | * | 4/1995 | King | A47J 27/0817 99/404 |
| 5,617,777 A | | 4/1997 | Davis et al. | |
| 5,721,001 A | | 2/1998 | Ishikura et al. | |
| 5,942,269 A | | 8/1999 | Casey et al. | |
| 5,973,297 A | | 10/1999 | Winter et al. | |
| 6,022,572 A | | 2/2000 | Winter et al. | |
| D434,593 S | * | 12/2000 | Werts | D7/347 |
| 6,242,025 B1 | | 6/2001 | Lesky et al. | |
| 6,283,014 B1 | * | 9/2001 | Ng | A47J 27/0802 219/431 |
| 6,505,546 B1 | | 1/2003 | Koether et al. | |
| 6,810,791 B2 | | 11/2004 | Kijimoto | |
| 6,935,223 B2 | * | 8/2005 | Kobayashi | A47J 27/0817 126/374.1 |
| 7,810,488 B2 | * | 10/2010 | Manganiello | A21B 3/04 126/20 |
| 8,689,679 B2 | * | 4/2014 | Tiszai | A47J 37/1266 99/334 |
| 9,161,650 B2 | * | 10/2015 | Wood | A47J 27/0804 |
| 9,228,965 B2 | * | 1/2016 | Burkett | A47J 37/1266 |
| 9,814,355 B2 | * | 11/2017 | Winter | A47J 37/1223 |
| 2002/0038604 A1 | * | 4/2002 | Chikazawa | A47J 37/1285 99/330 |
| 2004/0112225 A1 | * | 6/2004 | Mercer | A47J 37/1266 99/330 |
| 2004/0144258 A1 | * | 7/2004 | Kobayashi | A47J 27/0817 99/331 |
| 2004/0163547 A1 | * | 8/2004 | Kijimoto | A47J 27/0817 99/330 |
| 2004/0177767 A1 | | 9/2004 | Kijimoto | |
| 2008/0121115 A1 | * | 5/2008 | Tiszai | A47J 37/1266 99/334 |
| 2008/0121578 A1 | * | 5/2008 | Burkett | A47J 37/1223 210/167.28 |
| 2008/0229934 A1 | | 9/2008 | Theodos et al. | |
| 2009/0084273 A1 | | 4/2009 | Lackman et al. | |
| 2009/0255411 A1 | * | 10/2009 | Takahashi | A47J 37/1233 99/407 |
| 2010/0116345 A1 | | 5/2010 | Florkey et al. | |
| 2010/0300980 A1 | * | 12/2010 | Burkett | A47J 37/1223 210/741 |
| 2011/0003048 A1 | * | 1/2011 | Sugimoto | A47J 27/004 426/509 |
| 2012/0199571 A1 | | 8/2012 | Brown | |
| 2013/0098251 A1 | * | 4/2013 | Lambert | A47J 37/1223 99/408 |
| 2013/0098847 A1 | * | 4/2013 | Lambert | A47J 37/1223 210/744 |
| 2013/0249698 A1 | | 9/2013 | Fissler | |
| 2013/0263746 A1 | * | 10/2013 | Novak | A47J 27/18 99/330 |
| 2014/0076904 A1 | | 3/2014 | Wood et al. | |
| 2015/0223627 A1 | * | 8/2015 | Li | A47J 27/04 99/337 |
| 2016/0166112 A1 | * | 6/2016 | Florkey | A47J 37/1285 426/231 |

OTHER PUBLICATIONS

International Searching Authority, International Search Report and Written Opinion cited in International Appl. No. PCT/US2017/014298 dated Apr. 10, 2017 (11 pages).

International Search Report and Written Opinion cited in International Appl. No. PCT/US2014/064504 dated Feb. 12, 2015.

\* cited by examiner

PRESSURE ASSIST FEATURE FOR PRESSURE FRYER

CROSS-REFERENCE TO RELATED APPLICATIONS

This application is a continuation-in-part of application Ser. No. 14/077,930 (pending), filed Nov. 12, 2013, the disclosure of which is hereby incorporated by reference herein. Further, this application claims the benefit of Provisional Application Ser. No. 62/281,503, filed Jan. 21, 2016, the disclosure of which is hereby incorporated by reference herein.

TECHNICAL FIELD

The invention generally relates to pressure fryers, and in particular, to systems and methods for adjusting pressure in a cooking chamber of a pressure fryer.

BACKGROUND

Pressure fryers are used to cook various food products, such as poultry, fish, potato products, and the like. Pressure fryers include one or more cooking chambers, sometimes referred to as "fryer pots", that are filled with a cooking medium such as oil or solid fats (e.g., shortening). Each cooking chamber includes a lid that seals the chamber and a heating element that heats the cooking medium to a desired cooking temperature. The amount of time sufficient to cook the food product at a given cooking temperature may depend on the type and the amount of food product that is being cooked in the cooking chamber. When the food product is submerged in the hot cooking medium, the food product begins to cook and release steam, which pressurizes the cooking chamber. The increased pressure in the cooking chamber reduces the cooking time and helps prevent the food product from drying out, in an optimum pressure cooking cycle.

Pressure fryers typically include a valve that selectively allows the pressure within the cooking chamber to vent prior to opening the lid. The valve is closed during the cooking cycle so that pressure can build up in the cooking chamber. This build-up of pressure is caused, at least in part, by steam generated through vaporization of moisture within the food product. During cooking, a pressure regulator or control valve may be used to limit the operating pressure to an optimal level, typically about 11-12 Pounds per Square Inch (PSI). How quickly the pressure in the cooking chamber reaches the optimal operating pressure is dependent on how much moisture is in the food product and on how much food product is loaded into the pressure fryer.

Typically, large loads of food product with a high moisture level and/or a high surface area result in a cooking cycle that reaches its optimum operating pressure faster than a small load of food product having a low moisture content and/or a low surface area. For example, cooking a full 8-head load of chicken may result in a cooking cycle that reaches the optimum operating pressure for cooking chicken in four to five minutes. In contrast, cooking a 2-head load of chicken may take substantially longer to reach the optimum operating pressure. For a typical cooking cycle of between twelve and twenty minutes, pressure fryers may be designed to produce optimal results for a full load of chicken. Thus, because a smaller load may take nearly the entire cooking cycle to reach optimal operating pressure, smaller loads may require longer overall cooking times to avoid undercooking. This longer cooking time and lack of pressure may result in small loads failing to benefit from the advantages of pressure-frying.

Thus, there is a need for improved systems and methods for adjusting the pressure in pressure fryers that reduces the dependence of pressure on the properties of the food load.

SUMMARY

In an embodiment of the invention, a pressure fryer is provided. The pressure fryer includes a cooking chamber, a valve that vents the cooking chamber when the valve is open, a pressure assist system for selectively supplying a gas into the cooking chamber, and a controller in communication with the valve and the pressure assist system. The controller is configured to detect closure of the valve, and in response to detecting closure of the valve, determine a pressure in the cooking chamber. The controller compares the pressure in the cooking chamber to a predetermined pressure to determine whether the pressure in the cooking chamber is less than the predetermined pressure. In response to the pressure in the cooking chamber being less than the predetermined pressure and the valve being closed, the controller activates the pressure assist system to supply the gas into the cooking chamber to further pressurize the cooking chamber. The use of the pressure assist system allows for optimal pressure cooking of batches of food of various amounts with the same pressure fryer.

In another embodiment of the invention, a method of adjusting pressure in the cooking chamber of the pressure fryer is provided. The method includes detecting the closure of the valve that vents the cooking chamber when the valve is open, and in response to detecting the closure of the valve, determining the pressure in the cooking chamber. The method further comprises comparing the pressure in the cooking chamber to the predetermined pressure to determine whether the pressure in the cooking chamber is less than the predetermined pressure, and in response to the pressure in the cooking chamber being less than the predetermined pressure and the valve being closed, activating the pressure assist system to supply the gas into the cooking chamber to further pressurize the cooking chamber.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to systems and methods of controlling a pressure fryer, and in particular, for adjusting the pressure in a cooking chamber of the pressure fryer. To this end, the pressure fryer may include a pressure assist system coupled to the cooking chamber, and a controller in communication with the pressure assist system. In response to signals from a pressure sensor indicating the pressure in the cooking chamber is below an optimal or target pressure, the controller may activate the pressure assist system to supply air or other gas to the cooking chamber to increase the pressure in the cooking chamber.

Figure 1:
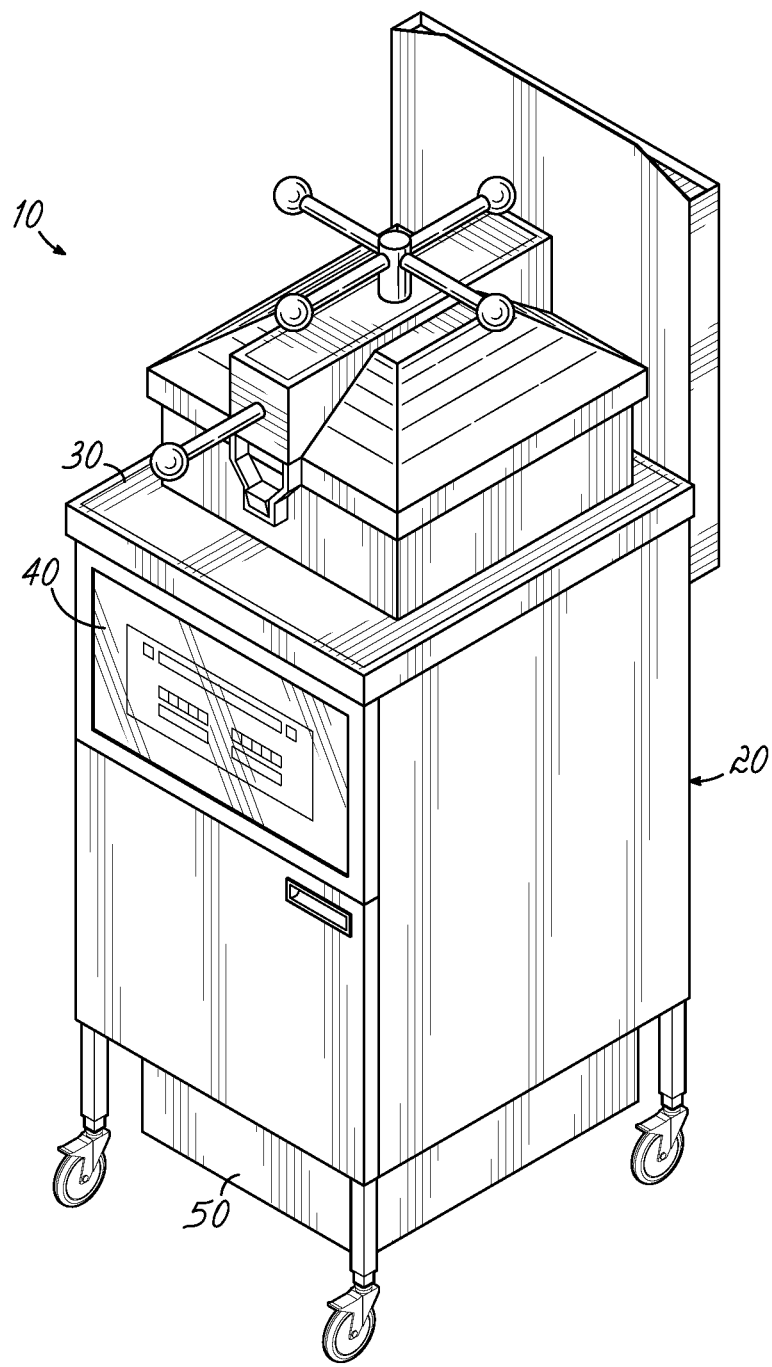
FIG. 1 is a top perspective view of a pressure fryer according to an embodiment of the invention.

Referring now to the figures, FIG. 1 depicts a pressure fryer 10 that includes a cooking chamber 20 (sometimes referred to as a "cooking vessel" or "fry pot"), a lid 30, a control panel 40, and a drain pan 50. The lid 30 may provide an opening for placing food product into the cooking chamber 20, and may be configured to form a pressure-tight seal with the cooking chamber 20 when in a closed or latched state. The control panel 40 may provide a human-machine interface configured to receive commands from a user of the pressure fryer 10, and to display information regarding a status of the pressure fryer 10. The drain pan 50 may collect cooking medium drained from cooking chamber 20 for either disposal, or filtering and reuse.

Figure 2:
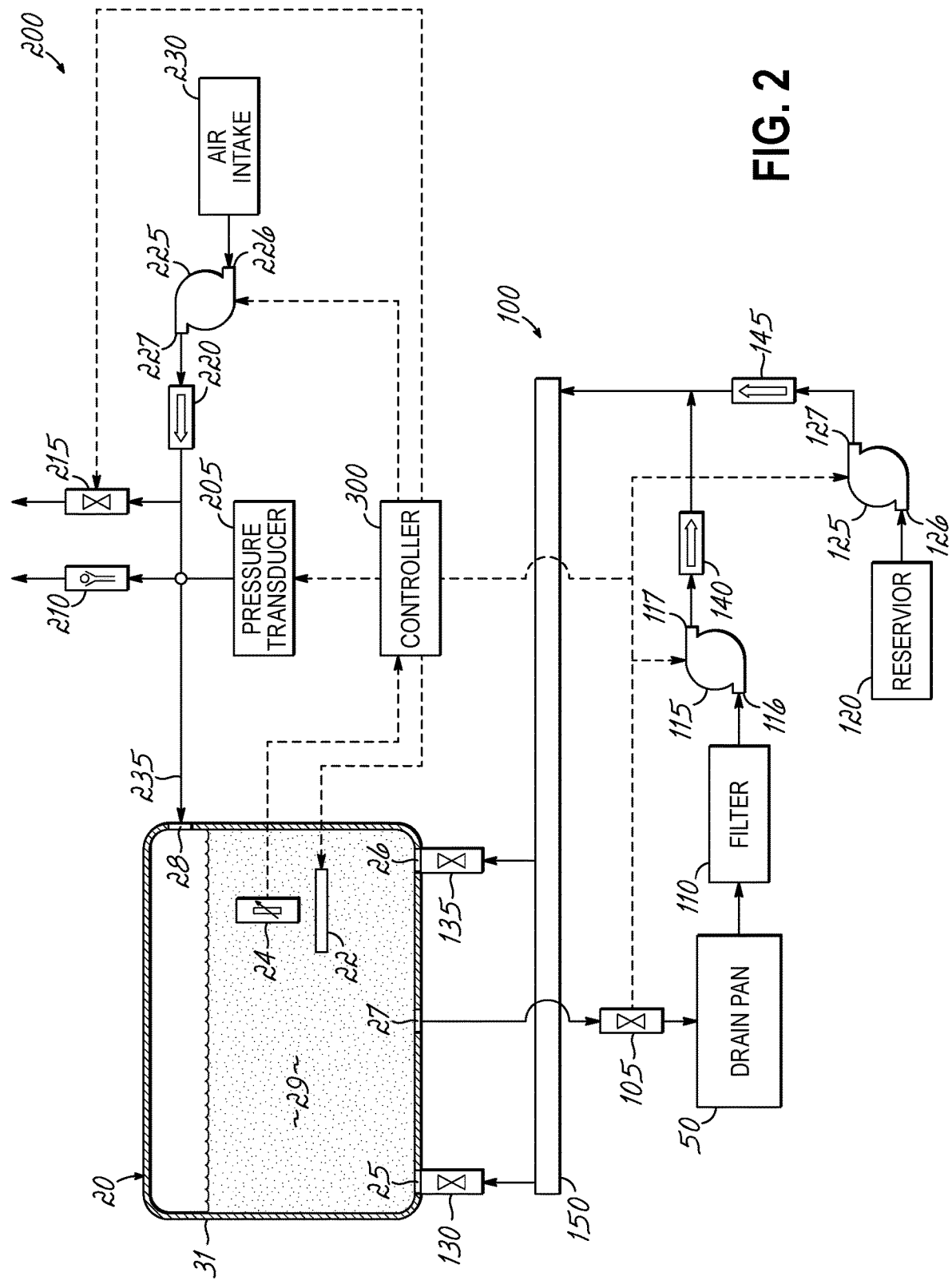
FIG. 2 is a diagrammatic view of the pressure fryer of FIG. 1 depicting a cooking chamber, a filtration system, a pressure assist system having an air pump, and a controller.

Referring now to FIG. 2, the cooking chamber 20 may include at least one heating element 22, at least one temperature sensor 24, a plurality of orifices 25-28, and be at least partially filled with a cooking medium 29, such as cooking oil.

The heating element 22 may be disposed within the cooking chamber 20 for heating the cooking medium 29, and may include an electrical heating element (e.g., a heating coil immersed in the cooking medium 29) or a gas heating element (e.g., a gas burner and heat exchanger that transfers heat from the burner to the cooking medium 29).

One or more of the orifices (e.g., orifices 25 and 26) may provide inlets for adding cooking medium 29 to the cooking chamber 20, and at least one orifice (e.g., orifice 27) may provide an outlet for draining the cooking medium 29 into the drain pan 50. At least one additional orifice (e.g., orifice 28) may provide an inlet for air or another suitable gas used to pressurize the cooking chamber 20. The gas inlet may be positioned within the cooking chamber 20 above a fill-line 31 of the cooking medium 29 to avoid having gas dispersed through the cooking medium 29. As set forth below, gas in the cooking chamber 20 may also be vented or removed via this orifice 28.

The at least one orifice 27 used to drain the cooking medium 29 may be configured to promote swirling as the cooking medium 29 drains from the cooking chamber 20. This swirling may contribute to removal of cooking by-products or other particles that have settled to the bottom of the cooking chamber 20. The one or more orifices 25, 26 used to fill the cooking chamber 20 may be configured to direct cooking medium 29 towards the at least one orifice 27 to further promote removal of food by-products as part of a draining operation.

With continued reference to FIG. 2, the pressure fryer 10 may further include a filtration system 100, a pressure assist system 200, and a controller 300. The filtration system 100 may include a drain valve 105, a cooking medium filter assembly 110, a filter pump 115, an Automatic Top Off (ATO) reservoir 120, an ATO pump 125, check valves 130, 135, 140, 145, and a fill manifold 150. The drain valve 105 may couple the cooking chamber 20 to the drain pan 50, thereby allowing the cooking medium 29 to be drained into the drain pan 50. The filter pump 115 may be configured to draw cooking medium out of the drain pan 50 and through the filter assembly 110. The filter assembly 110 may include a housing configured to accept a filter for filtering the cooking medium 29. The filtered cooking medium may be discharged into the fill manifold 150 through the check valve 140. The filtered cooking medium may then flow from the fill manifold 150 into the cooking chamber 20 through check valves 130, 135, and enter the chamber through the one or more orifices 25, 26. Regular use of filtering cycles to clean the cooking medium 29 may reduce consumption of cooking medium and increase the availability of the pressure fryer by providing hot, filtered cooking medium ready for immediate use to the cooking chamber 20.

The filter pump 115 and ATO pump 125 may each include a pump inlet 116, 126 on a suction side of the pump, and a pump outlet 117, 127 on a pressure side of the pump. Although filter assembly 110 is depicted as being coupled to the inlet 116 of filter pump 115 in the exemplary embodiment illustrated by FIG. 2, it should be understood that the filtration system 100 is not limited to the specific arrangement of components depicted in FIG. 2. For example, the filter assembly 110 could be coupled to the outlet 117 of filter pump 115 rather than the inlet 116.

The ATO reservoir 120 may contain reserve cooking medium, and may be coupled to the cooking chamber 20 by the one or more orifices 25, 26, ATO pump 125, check valve 145, and fill manifold 150. In an embodiment of the invention, each check valve 130, 135 coupling the cooking chamber 20 to the fill manifold 150 may be located proximate to a respective orifice 25, 26 of the cooking chamber 20. Check valves 130, 135 may be configured to prevent the cooking medium 29 in the cooking chamber 20 from back-flowing into the fill manifold 150. Check valve 140 may be located proximate to the outlet 117 of filter pump 115, and may couple the outlet 117 of filter pump 115 to the fill manifold 150. Check valve 140 may prevent cooking medium 29 from back flowing into the filter pump 115 from the fill manifold 150, e.g., during an automatic top-off operation while the ATO pump 125 is running. Check valve 145 may be located proximate to the outlet 127 of ATO pump 125, and may couple the outlet 127 to the fill manifold 150. The check valve 145 may thereby prevent cooking medium 29 from back flowing into the ATO pump 125 from the fill manifold 150, e.g., during a filtering cycle when the filter pump 115 is running.

The pressure assist system 200 of this embodiment includes a pressure transducer 205, a pressure relief valve 210, a pressure control valve 215, a check valve 220, an air pump 225, and an air intake assembly 230. The air pump 225 may include a pump inlet 226 on the suction side of the pump, and a pump outlet 227 on a pressure side of the pump. The air intake assembly 230 may couple the pump inlet 226 to the ambient atmosphere, and may include an air filter that removes dust and other particulates from air drawn into the air pump 225. The check valve 220 may couple the pump outlet 227 to an air inlet tube, such as gas manifold 235, that directs the air into the cooking chamber 20. Although the pressure transducer 205, pressure relief valve 210, pressure control valve 215, and the output of the check valve 220 are depicted as being coupled to the cooking chamber 20 by the gas manifold 235, it should be understood that each of these components or subsets thereof may be coupled to the cooking chamber 20 in any suitable manner, such as by a direct connection. It will be understood that the air pump 225 may be mounted along a rear side of the pressure fryer 10, or at any other convenient location.

The pressure transducer 205 may include an absolute pressure sensor that measures the pressure inside the cooking chamber 20 relative to a perfect vacuum, a gauge pressure sensor that measures the pressure inside the cooking chamber 20 relative to the ambient atmospheric pressure outside the cooking chamber 20, or any other suitable type of pressure sensor. The pressure transducer 205 may be in communication with the controller 300 so that the controller 300 receives signals indicative of the pressure inside the cooking chamber 20.

The pressure relief valve 210 may comprise a spring-loaded valve, a dead-weight valve, or other suitable type of valve configured to release pressure from the cooking chamber 20 in response to the pressure exceeding a predetermined operational level. In response to the pressure reaching or exceeding the operational level, the pressure relief valve 210 may open autonomously to vent gases from the cooking chamber 20.

The pressure control valve 215 may be a solenoid valve or other suitable electromechanically or pneumatically operated valve in communication with the controller 300. The pressure control valve 215 may enable the controller 300 to control pressure in the cooking chamber 20 by opening or closing the pressure control valve 215. The pressure control valve 215 may also be used as a "pressure output", for example, to equalize pressure in the cooking chamber 20 with the ambient environment prior to the user opening the lid 30, such as by releasing additional pressure via the orifice 28 that also acts as a gas inlet to cooking chamber 20. In an embodiment of the invention, the controller 300 may be configured to control the pressure in the cooking chamber 20 to a desired operating pressure by selectively activating the pressure control valve 215 while the food product is being cooked. In this embodiment, the controller 300 may be configured to set the operating pressure based on the type of food product being cooked.

The air pump 225 may be a positive displacement or other suitable type of pump for pumping air from the ambient environment into the cooking chamber 20, and may be coupled to the gas manifold 235 by check valve 220. In response to activation by the controller 300, the air pump 225 may draw air through the air intake assembly 230, and provide air to the cooking chamber 20 via the gas manifold 235.

Figure 3:
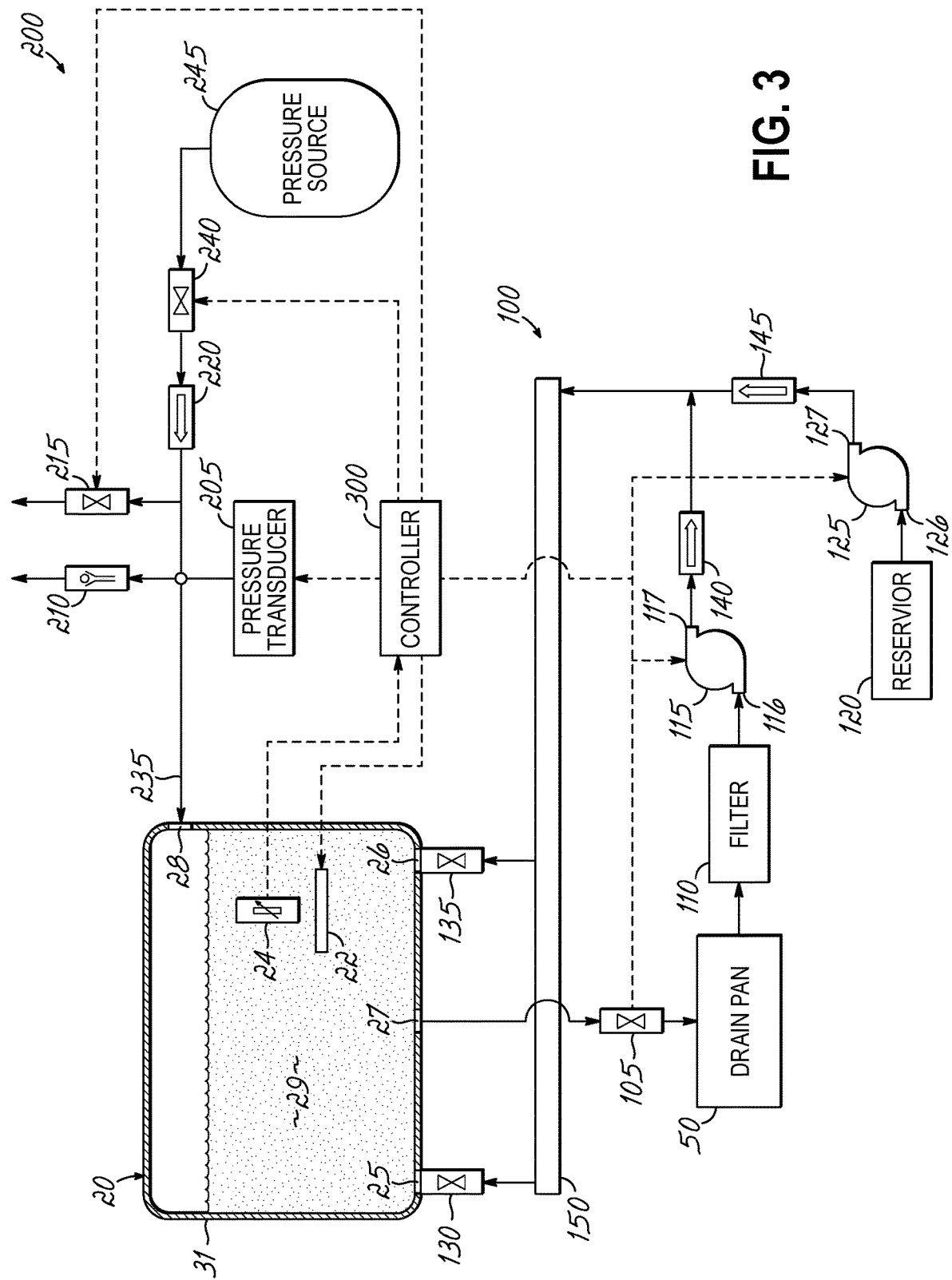
FIG. 3 is a schematic view of the pressure fryer of FIG. 1 depicting the cooking chamber, the filtration system, the pressure assist system having a pressure source, and the controller.

Referring now to FIG. 3, in an alternative embodiment of the invention, the pressure assist system 200 includes a pressure supply valve 240 and a pressure source 245 in addition to or in place of the air pump 225 and air intake assembly 230 of the FIG. 2 embodiment. The pressure source 245 may be coupled to the check valve 220 by the pressure supply valve 240. The pressure supply valve 240 may be in communication with the controller 300 to enable the controller 300 to control the amount of gas provided to the gas manifold 235. The pressure source 245 may include a tank of pressurized gas, e.g., a tank of pressurized carbon dioxide. One source of pressurized carbon dioxide that may be coupled to the pressure supply valve 240 is a source of carbon dioxide gas used to carbonate fountain drinks. In this case, a line may be run from pressure supply valve 240 to the carbon dioxide tanks used to supply the fountain drink station.

In response to determining that a cooking cycle requires pressure assist, the controller 300 may open the pressure supply valve 240, thereby allowing the pressurized gas (e.g., carbon dioxide from the tanks) to flow into the cooking chamber 20. The controller 300 may monitor the pressure in the cooking chamber 20 while the pressure supply valve 240 is open by sampling signals provided by the pressure transducer 205. In response to the pressure in the cooking chamber 20 reaching an optimal operating pressure, the controller 300 may shut the pressure supply valve 240, thereby cutting off the flow of pressurized gas from the pressure source 245. From this point on, steam generated from cooking the food product typically maintains the cooking chamber 20 at the optimal operating pressure. The controller 300 may be configured to follow a predetermined pressurization curve when ramping up the pressure in the cooking chamber 20 by, for example, cycling the pressure supply valve 240 between an open and closed state, or by adjusting the pressure supply valve 240 to allow a variable flow of gas into the cooking chamber 20. The controller 300 may thereby cause the pressure during the cooking cycle to duplicate the pressure level with respect to time that would normally occur with a full load of food product.

Advantageously, embodiments of the invention including the pressure source 245 may reduce the cost and complexity of the pressure fryer 10 by eliminating the air pump 225 in favor of pressurized carbon dioxide, which is often available in restaurants to support their fountain drink stations. Moreover, the pressure supply valve 240 may have a minimum cycle time that is shorter than the air pump 225. The ability to cycle the pressure supply valve 240 on and off at a higher rate than is possible with the air pump 225 may enable the controller 300 to more precisely control the pressure as the pressure is ramped up in the cooking chamber 20. This increased level of control may allow the controller 300 to raise the pressure at a rate that more closely simulates the pressure increase experienced when cooking a full load of food product. This may enable the pressure fryer 10 to avoid an overly rapid pressurization of the cooking chamber 20, which may in turn result in a further improved cooked food product and/or optimal cooking cycle.

Figure 4:
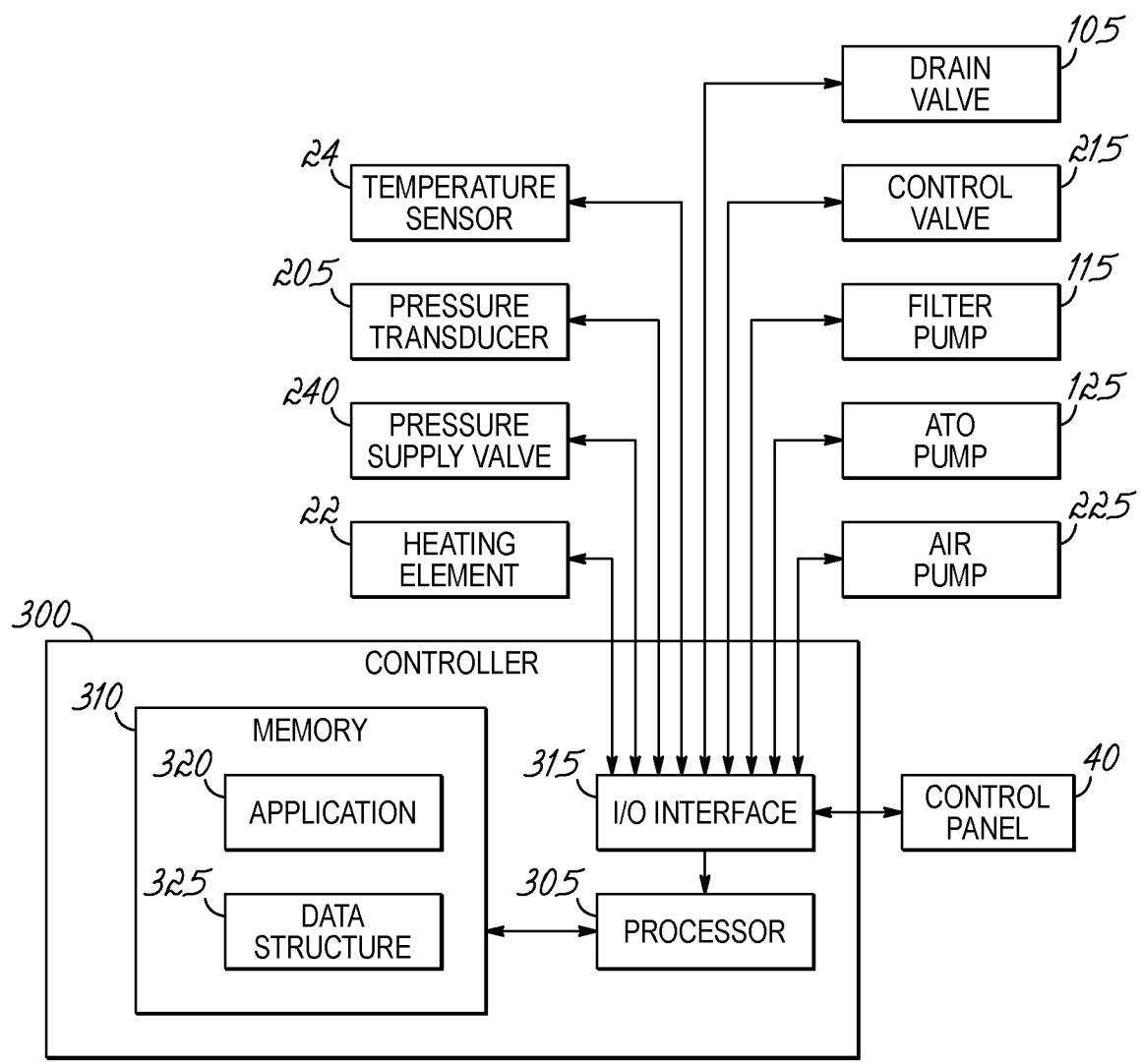
FIG. 4 is a diagrammatic view of the controller of FIGS. 2 and 3.

Referring now to FIG. 4, the controller 300 may include a processor 305, a memory 310, and an input/output (I/O) interface 315. The processor 305 may include one or more devices configured to manipulate signals and/or data based on operational instructions that are stored in memory 310. Memory 310 may include a single memory device or a plurality of memory devices configured to store information in the form of data. The memory 310 may store computer program code embodied as one or more computer software applications comprising instructions executed by the processor 305, such as a controller application 320. One or more data structures 325 may also reside in memory 310, and may be used by the processor 305 and/or controller application 320 to store and process data.

The I/O interface 315 operatively couples the processor 305 to other components of the pressure fryer 10, such as the heating element 22, temperature sensor 24, control panel 40, drain valve 105, filter pump 115, ATO pump 125, pressure transducer 205, pressure control valve 215, air pump 225, and/or pressure supply valve 240. The I/O interface 315 may include signal processing circuits that condition incoming and outgoing signals so that the signals are compatible with both the processor 305 and the components to which the processor 305 is coupled. To this end, the I/O interface 315 may include analog-to-digital (A/D) and/or digital-to-analog (D/A) converters, voltage level and/or frequency shifting circuits, optical isolation and/or driver circuits, data busses, and/or any other analog or digital circuitry suitable for coupling the processor 305 to the other components of the cooking apparatus.

The control panel 40 may be operatively coupled to the processor 305 of controller 300 in a known manner to provide a user interface that allows a user to interact with the controller 300. The control panel 40 may include a display having suitable audio and visual indicators capable of providing information to the user. The control panel 40 may also include input devices and controls capable of accepting commands or input from the user and transmitting the entered input to the processor 305. In this way, the control panel 40 may enable manual initiation or selection of system functions, for example, during set-up of the pressure fryer 10.

During a filtering cycle, the filter pump 115 may be used to circulate the cooking medium 29 through the cooking medium filter assembly 110 before returning the filtered cooking medium 29 to the cooking chamber 20. During normal filtration, controller 300 may cause the drain valve 105 to open, allowing the cooking medium 29 to flow from the cooking chamber 20 into drain pan 50, e.g., under the force of gravity. Concurrently with the opening of the drain valve 105, the controller 300 may activate the filter pump 115 so that the cooking medium is conveyed from the drain pan 50 back into the cooking chamber 20 via the fill orifices 25, 26. The controller 300 may be configured to monitor the amount of time that the filter pump 115 is activated or inactive. For example, during the filtering cycle, the controller 300 may activate the filter pump 115 for a predetermined amount of time sufficient to filter the amount of cooking medium 29 contained by the cooking chamber 20.

The controller 300 may also activate the ATO pump 125 to add cooking medium from the ATO reservoir 120 to the cooking chamber 20, either during the filtering cycle or at other times when the controller 300 determines the level of cooking medium 29 in the cooking chamber 20 is low. The controller 300 may activate the ATO pump 125, for example, in response to determining that the cooking medium 29 in cooking chamber 20 is below a recommended level (e.g., the fill-line 31). The controller 300 may pump reserve cooking medium from ATO reservoir 120 to cooking chamber 20 for a predetermined amount of time, e.g., to replace a known amount of cooking medium normally lost during the filtering cycle. In another embodiment of the invention, the controller 300 may cause the ATO pump 125 to run until the controller 300 determines the level of cooking medium 29 in the cooking chamber 20 has reached the recommended level, e.g., in response to receiving a signal from a cooking medium level sensor (not shown) indicating the cooking chamber 20 is full.

In response to initiation of a cooking cycle, the controller 300 may take one or more pressure readings by, for example, sampling a signal output by the pressure transducer 205. In response to the pressure reaching a predetermined value, such as the optimal operating pressure of the pressure fryer 10, regulating devices (e.g., the pressure relief valve 210) of pressure fryer 10 may operate to prevent the cooking chamber 20 from over pressurizing. For embodiments in which the pressure fryer 10 is not configured to self-regulate pressure in cooking chamber 20, the controller 300 may compare the pressure readings obtained from the pressure transducer 205 to a predetermined pressure, e.g., an optimum operating pressure for the cooking cycle and/or a maximum allowable pressure of the pressure fryer 10. In response to this comparison indicating the pressure in the cooking chamber 20 is at or above the predetermined pressure, the controller 300 may cause gas to be vented from the cooking chamber 20 by opening the pressure control valve 215.

To begin a cooking cycle, a desired amount of food product may be placed into cooking chamber 20, and the lid 30 closed to form an airtight seal. The user may then input a sequence of time, temperature, and pressure combinations using the control panel 40. In an alternative embodiment of the invention, the user may input food product information (e.g., weight, type of food product, size of food product, amount of food product, bone-in or bone-out food product, type of breading used, amount of marinade or solution injected into food product, or any other suitable information), and the controller 300 may determine the time, temperature, and pressure combination sequences for cooking the food product based on the entered information.

At the beginning of the cooking cycle, the pressure control valve 215 may be open to allow air and steam to vent freely from the cooking chamber 20. The pressure control valve 215 may remain open for a period of time (e.g., a few minutes) at the beginning of the cooking cycle to prevent pressure from building in the cooking chamber 20. The length of the venting period may be set by the user or determined by the controller 300 based on the cooking cycle selected by the user. In any case, in response to the venting period expiring, the controller 300 may cause the pressure control valve 215 to close.

Figure 5:
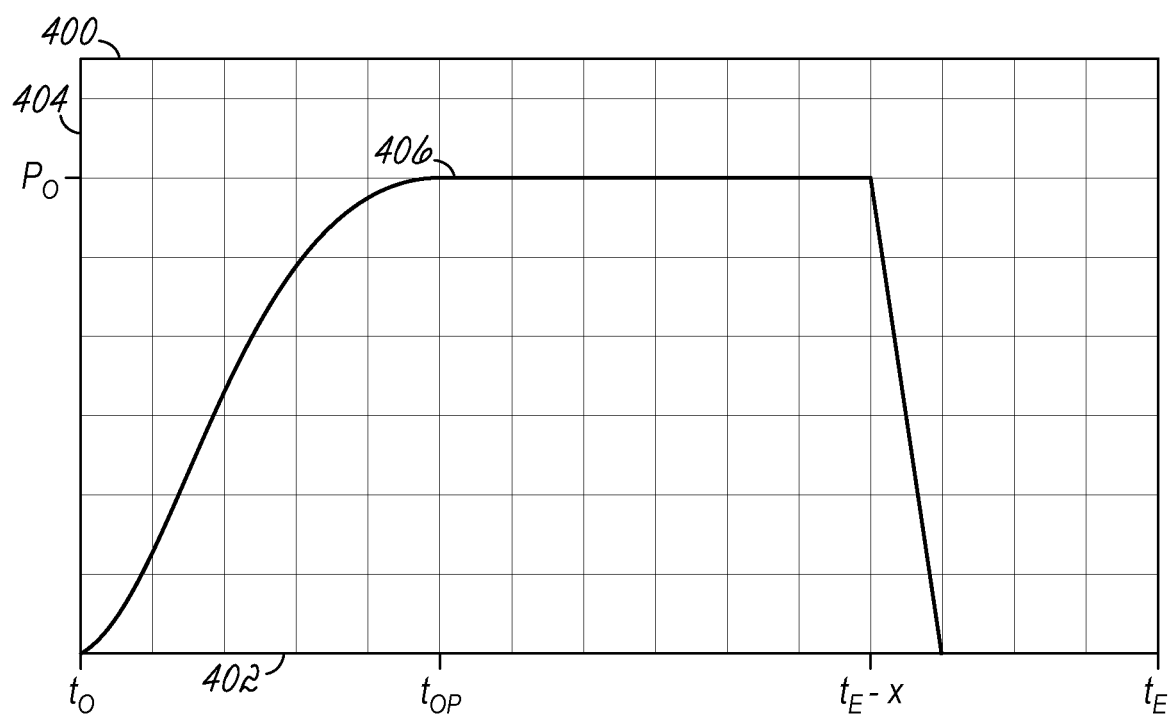
FIG. 5 is a graphical view showing a plot of the pressure in the cooking chamber of FIGS. 1-3 as a function of time during a cooking cycle.

Referring now to FIG. 5, and for purposes of illustration only, an exemplary graph 400 includes a horizontal axis 402 corresponding to an amount of time (e.g., a number of minutes) since the pressure control valve 215 was closed, a vertical axis 404 corresponding to an amount of pressure (e.g., PSI) in the cooking chamber 20, and a pressure curve 406 depicting pressure in the cooking chamber 20 as a function of time. As can be seen, pressure may begin to build in the cooking chamber 20 from the moment the pressure control valve 215 is closed at $t=t_0$. The pressure may continue to increase steadily toward the optimum operating pressure $P_O$ (e.g., about 11-12 PSI) until $t=t_{OP}$. The time between $t=t_0$ and $t=t_{OP}$ may be referred to as the "pressure ramp-up period". The optimum operating pressure $P_O$ may be a pre-set pressure at which a selected cooking cycle is designed to operate, and may vary depending on the type and amount of food product being cooked. The optimum operating pressure $P_O$ may also be set by the user entering a value for the optimum operating pressure $P_O$ using the control panel. Once the optimum operating pressure $P_O$ is reached, the pressure relief valve 210 and/or controller 300 may maintain the pressure within cooking chamber 20 at the optimum operating pressure $P_O$.

At a predetermined time $t_E$-x prior to the end of the cooking cycle (e.g., a few minutes before the cooking cycle is complete), the controller 300 may cause the pressure control valve 215 to open and allow gasses to vent out of the cooking chamber 20. This may result in the pressure inside the cooking chamber 20 dropping, as indicated by the downward slope of pressure curve 406 beginning at $t=t_E-x$. At time $t_E$, the cooking cycle is complete, and the food product may be removed from the cooking chamber 20.

The above described cooking cycle may be exemplary of a cooking cycle for a large load of food product (e.g., a full, 8-head load of chicken) under optimal conditions and without use of the pressure assist feature. However, the above cooking cycle may be less efficient when cooking a smaller load of food product (e.g., a 2-head load of chicken). Specifically, large loads of food product may contain more moisture and more volume than small loads. This increased amount of moisture may cause the cooking cycle to reach the optimum operating pressure sooner than with a smaller load of food product. In some cases, a small load of food product may take nearly the entire cooking cycle time to reach the optimum operating pressure. This lengthened pressure ramp-up time may negate many of the benefits of using a pressure fryer.

To solve this problem, the controller 300 may activate the pressure assist system 200 by causing power to be applied to the air pump 225, or by causing the pressure supply valve 240 to open, during the cooking cycle to more rapidly pressurize the cooking chamber 20. The pressure assist feature may increase the amount of time the food product is cooked at the optimal operating pressure $P_O$ as compared to pressure fryers lacking this feature, particularly when cooking less than a full load of food product.

Figure 6:
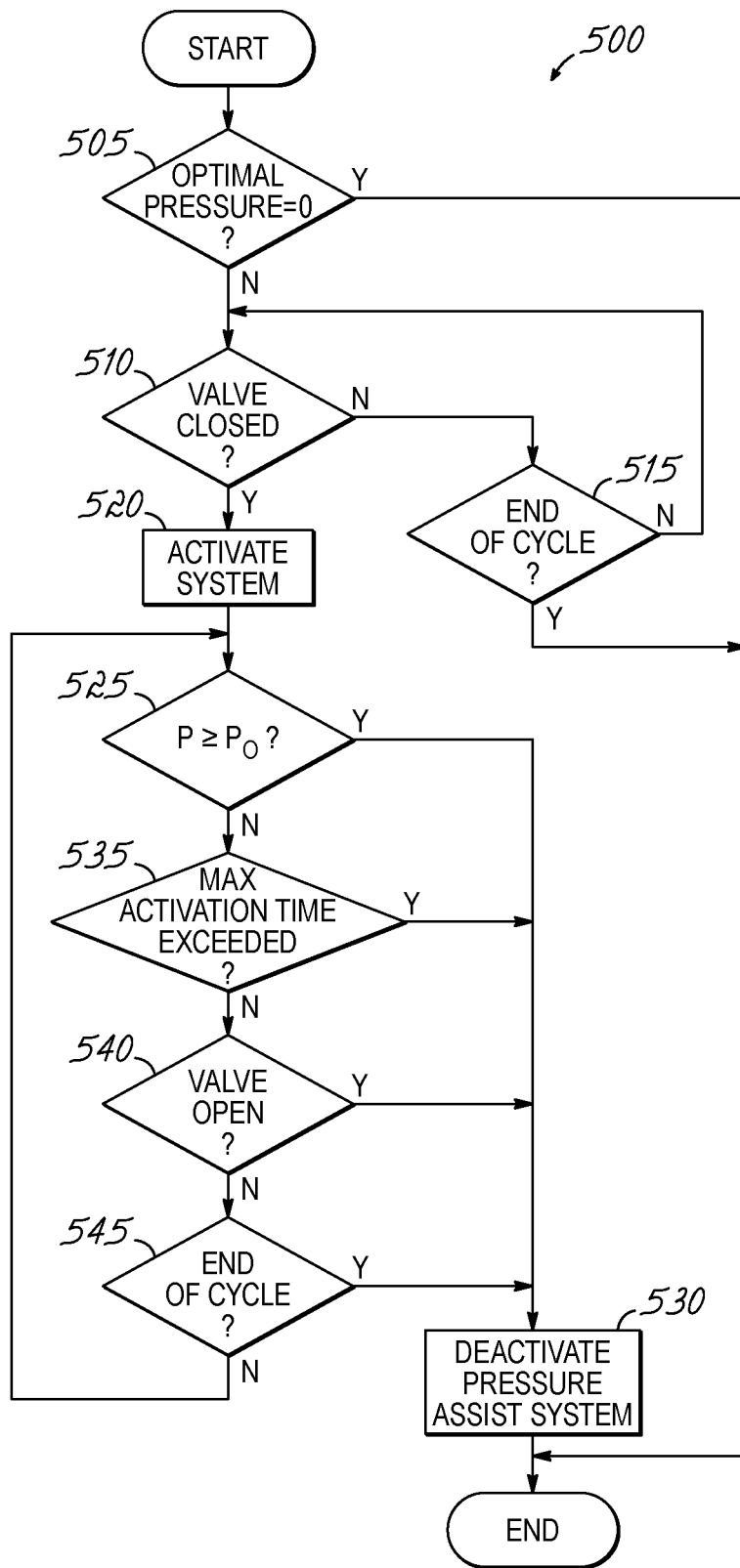
FIG. 6 is a flow chart of a pressure assist process that may be implemented by the controller of FIGS. 2-4 in an embodiment of the invention.

Referring to FIG. 6, a flowchart is presented that depicts a process 500 which may be executed by the controller 300 to implement the pressure assist feature. Process 500 may be initiated at the beginning of a cooking cycle, and may be executed by the controller 300 in parallel with other processes used to control the pressure fryer 10 during the cooking cycle.

In block 505, the process 500 may determine if the optimal operating pressure $P_O$ for the selected cooking cycle is zero. The optimal operating pressure $P_O$ may be zero, for example, if the cooking cycle is for food products that are normally prepared in an open fryer, that do not require prolonged cooking at the optimal operating pressure $P_O$, or that have a cooking time which is too short for the pressure assist feature to be effective. If the optimal operating pressure $P_O$ is zero ("YES" branch of decision block 505), the process 500 may terminate and allow the cooking cycle to complete without activating the pressure assist system 200.

In response to determining the optimal operating pressure $P_O$ is not zero ("NO" branch of decision block 505), the process 500 may proceed to block 510. In block 510, the process 500 may determine if the pressure control valve 215 is closed. As described above, the pressure control valve 215 may be open at the beginning of the cooking cycle to allow excess moisture and steam to vent from the cooking chamber 20. If the process 500 determines the pressure control valve 215 is not closed ("NO" branch of decision block 510), the process may proceed to block 515 and determine if the end of the cooking cycle has been reached.

The process 500 may consider the end of the cooking cycle to have been reached if there is less than a predetermined amount of time (e.g., 90 seconds) left in the cooking cycle, or if the cooking cycle has been cancelled. These determinations may enable the process 500 to avoid activating the pressure assist system 200 if there is not enough time remaining in the cooking cycle for the food product to benefit from activating the feature. Similarly, if the process 500 determines that the cooking cycle has been cancelled (e.g., due to a system or user error), then the process 500 may terminate because there is no longer a need for the pressure assist feature.

If the process 500 determines that the pressure fryer 10 has not reached the end of the cooking cycle ("NO" branch of decision block 515), the process 500 may return to block 510. The process 500 may thereby continue to monitor the state of the pressure control valve 215 until the valve closes or the cooking cycle ends. By way of example, the process 500 may return to block 510 and check the state of the pressure control valve 215 periodically, e.g., between one and ten times per second, or at some other suitable frequency. If, during this valve monitoring phase, the process 500 determines the pressure fryer 10 has reached the end of the cooking cycle ("YES" branch of decision block 515), the process 500 may terminate and allow the cooking cycle to complete without activating the pressure assist system 200.

If the pressure control valve 215 is closed ("YES" branch of decision block 510), the process 500 may proceed to block 520 and activate the pressure assist system 200. Activating the pressure assist system 200 may include activating the air pump 225 or opening the pressure supply valve 240, as the case may be, to facilitate the build-up of pressure in the cooking chamber 20. It will be appreciated that the controller 300 may wait a predetermined time after detecting closure of the pressure control valve 215 to activate the pressure assist system 200.

In response to activating the pressure assist system 200, the process 500 may proceed to block 525 and determine the pressure in the cooking chamber 20. If the pressure P is equal to or greater than the optimal operating pressure $P_O$, ("YES" branch of decision block 525), the process 500 may proceed to block 530 and deactivate the pressure assist system 200. In an embodiment of the invention, after the pressure assist system 200 has been deactivated, pressure may be maintained at the optimal operating pressure $P_O$ for the remainder of the cooking cycle by the normal cooking process. However, in other embodiments, the pressure assist system 200 may be left on for the duration of the cooking cycle, e.g., to ensure that the pressure is maintained at the optimal operating pressure $P_O$. In any case, if the pressure is not equal to or greater than the optimal operating pressure $P_O$, ("NO" branch of decision block 525), the process 500 may proceed to block 535.

In block 535, the process 500 may compare the amount of time the pressure assist system 200 has been active ($t_{ACT}=t-t_0$) to a maximum allowable time $t_{MAX}$ the pressure assist system 200 is allowed to be active during the cooking cycle. If the activation time $t_{ACT}$ exceeds the maximum allowable time $t_{MAX}$ ("YES" branch of decision block 535), the process 500 may proceed to block 530 and deactivate the pressure assist system 200. If the activation time $t_{ACT}$ does not exceed the maximum allowable time $t_{MAX}$ ("NO" branch of decision block 535), the process 500 may proceed to block 540.

In block 540, the process 500 may determine if the pressure control valve 215 is open. As described above, the pressure control valve 215 may open at the predetermined time prior to the end of the cooking cycle to allow pressure to vent from the cooking chamber 20. If the process 500 determines the pressure control valve 215 is open ("YES" branch of decision block 540), the process 500 may proceed to block 530 and deactivate the pressure assist system 200. If the pressure control valve 215 is not open ("NO" branch of decision block 540), the process 500 may proceed to block 545.

In block 545, the process 500 may determine if the end of the cooking cycle has been reached. As described above with respect to block 515, the process 500 may determine the end of the cooking cycle has been reached if there is less than a predetermined amount of time left in the cooking cycle, or if the cooking cycle has been cancelled. If the process 500 determines that the end of the cooking cycle has not been reached ("NO" branch of decision block 545), the process 500 may return to block 525 to continue monitoring the cooking cycle. To this end, the process 500 may be configured to repeat the monitoring of pressure, actuation time, and valve status at regular intervals, e.g., once a second, once a minute, or any at other suitable frequency. If the process 500 determines that the end of the cooking cycle has been reached ("YES" branch of decision block 545), the process 500 may proceed to block 530 and deactivate the pressure assist system 200. By performing the process 500, optimal pressure cooking is achieved for different size batches of food placed in the pressure fryer 10.

Figure 7:
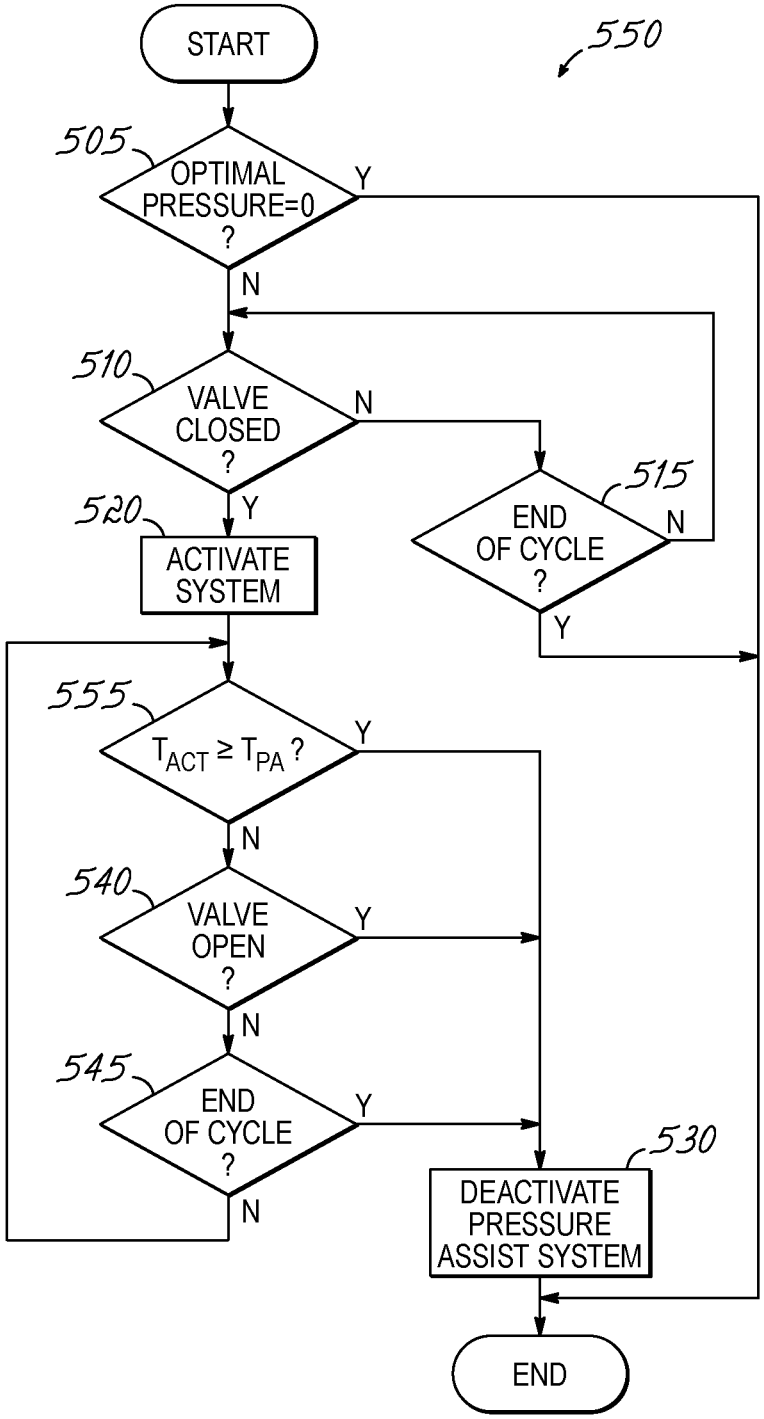
FIG. 7 is a flow chart of another pressure assist process that may be implemented by the controller of FIGS. 2-4 in another embodiment of the invention.

Referring to FIG. 7, a flowchart is presented that depicts a process 550 for controlling the pressure assist system 200 that may be executed by the controller 300 in an alternative embodiment of the invention. Blocks 505-520 of process 550 may executed by the controller 300 in generally the same manner as described above with respect to process 500. As described above with respect to process 500, in response to determining the pressure control valve 215 is closed ("YES" branch of decision block 510), process 550 may activate the pressure assist system 200. However, rather than checking the pressure in the cooking chamber 20, process 550 may proceed to block 555 and determine whether $t_{ACT}$ is greater than a predetermined pressure assist time $t_{PA}$. The pressure assist time $t_{PA}$ may be a predetermined period of time that it would normally take the pressure assist system 200 to boost the pressure in the cooking chamber 20 to the optimal operating pressure $P_O$. The pressure assist time $t_{PA}$ may be fixed, or may determined for the specific cook cycle being implemented based on characteristics of the load (e.g., the amount and type of food product being cooked), and/or the cooking cycle (e.g., temperature, duration, and optimal operating pressure $P_O$).

If the amount of time the pressure assist system 200 has been active $t_{ACT}$ is greater than or equal to the predetermined pressure assist time $t_{PA}$ ("YES" branch of decision block 555), the process 550 may proceed to block 530 and deactivate the pressure assist system 200. After the pressure assist system 200 has been deactivated, pressure may be maintained at the optimal operating pressure $P_O$ for the remainder of the cooking cycle by the normal cooking process. If the amount of time the pressure assist system 200 has been active $t_{ACT}$ is not greater than or equal to the predetermined pressure assist time $t_{PA}$ ("NO" branch of decision block 555), the process 500 may proceed to block 540. The remaining blocks of the process 550 may then be executed by the controller 300 in generally the same manner as described above with respect to process 500.

During the pressure ramp-up period, process 500 may continually or repeatedly monitor the pressure within cooking chamber 20 based on the signal provided by the pressure transducer 205, and process 550 may monitor the amount of time $t-t_0$ the pressure assist system 200 has been active. If process 500 determines that the optimal operating pressure $P_O$ has not been reached by $t_{MAX}$, the process 500 may deactivate the pressure assist system 200, as this may indicate a problem with either the pressure fryer 10 or the pressure assist system 200, e.g., a leak or malfunctioning component. In any case, the pressure assist system 200 may remain activated in response the pressure of cooking chamber 20 remaining below the optimal operating pressure $P_O$, or for a predetermined period of time after $t_0$ to approximate the optimal operating pressure $P_O$, as long as the pressure control valve 215 remains closed and the pressure fryer 10 does not reach the end of the cooking cycle.

If the optimal operating pressure $P_O$ is reached (i.e., the pressure within cooking chamber 20 is equal to or greater than the optimal operating pressure $P_O$), or the predetermined period of time is reached, the pressure assist system 200 may be deactivated. Embodiments of the invention may rely solely on monitoring the pressure or the activation time, or on combinations of pressure and activation time to determine when to activate or deactivate the pressure assist system 200. For embodiments in which the control process relies on activation time and not pressure to determine when to deactivate the pressure assist system 200, the pressure transducer 205 may be omitted from the pressure assist system 200. The predetermined amount of time for activating the pressure assist system 200 to reach the desired pressure may vary based on the cooking load in the vessel, ambient environment, or the type of food product being cooked. In other embodiments of the invention, the pressure assist system 200 may be maintained in an activated state for the entire duration of the cooking cycle, may be activated during only a portion of the cooking cycle, or may be activated and deactivated a plurality of times during the cooking cycle.

Advantageously, the pressure assist system 200 may enable more rapid pressurization of cooking chamber 20, especially when cooking smaller loads of food product, than is possible with pressure fryers lacking this feature. Embodiments of the invention may also optimize the amount of time during the cooking cycle at which the pressure fryer 10 is operating at the optimal operating pressure $P_O$, and provide an ability to fine-tune the pressurization of cooking chamber 20 to different levels and for different kinds and amounts of food products.

In another embodiment of the invention, the controller 300 may be configured to allow the pressure within the cooking chamber 20 to increase for a predetermined period of time $t_M$ before activating the pressure assist system 200. The controller 300 may then determine if the pressure has reached a predetermined target pressure $P_T$ (e.g., 7 PSI), which may be less than the optimal operating pressure $P_O$. For example, using the pressure transducer 205, the controller 300 may take pressure readings at a predetermined time $t=t_M$ after the pressure control valve 215 has closed, e.g., 90 seconds after valve closure.

If the pressure has not reached the target pressure $P_T$ by the predetermined time $t_M$, the controller 300 may determine that a small load of food is in the cooking chamber 20, and activate the pressure assist system 200. The controller 300 may also determine a difference between the pressure at time $t=t_M$ and the target pressure $P_T$, and calculate or otherwise determine the pressure assist time $t_{PA}$ or a rate at which the pressure assist system 200 supplies gas to the cooking chamber 20 based on this difference. The pressure assist system 200 may remain active until the end of the cooking cycle, for the pressure assist time $t_{PA}$, until the optimal operating pressure $P_O$ is reached, or turn off in response to the pressure control valve 215 or other venting mechanism depressurizing the cooking chamber 20. The controller 300 may determine that the cooking chamber 20 is being vented, for example, by detecting a sudden drop in pressure. If the pressure reaches the target pressure $P_T$ by the predetermined time $t_M$, the controller 300 may determine the load of food in the cooking chamber 20 is large enough to build sufficient pressure on its own, in which case the pressure assist system 200 may remain inactive for the duration of the cooking cycle.

Using a dedicated air pump 225 or pressure source 245 to pressurize the cooking chamber 20 may provide a number of advantages. For example it may allow the orifice 28 to be placed above the fill-line 31 of cooking medium 29. This placement may prevent pressure assist air/gas from being diffused through the cooking medium 29, which could potentially reduce the quality of the cooking medium 29 through oxidization, or otherwise causing the cooking medium 29 to degrade more rapidly. Diffusing gas through the cooking medium 29 may also lower the temperature of the cooking medium 29, which could have an undesirable effect on the cooking cycle. Using air pump 225 or pressure source 245 may also enable the pressure assist system 200 to control the pressure within the cooking chamber 20 more precisely than would otherwise be possible.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A pressure fryer comprising:
   a cooking chamber;
   a pressure sensor that senses a pressure in the cooking chamber;
   a pressure assist system for selectively supplying a gas into the cooking chamber, the pressure assist system including a pressure control valve that selectively vents the cooking chamber and a pressure source that selectively communicates via a second valve with the cooking chamber to add pressure thereto; and
   a controller in communication with the pressure control valve and the pressure assist system, the controller being configured to:
      selectively activate the pressure control valve of the pressure assist system to open and close, wherein when the pressure control valve is open, the cooking chamber is vented such that pressure is removed from the cooking chamber;
      determine a pressure in the cooking chamber by the pressure sensor;
      compare the pressure in the cooking chamber to a predetermined pressure to determine whether the pressure in the cooking chamber is less than the predetermined pressure;
      in response to both the pressure in the cooking chamber being less than the predetermined pressure and the pressure control valve being closed, activate the pressure assist system to supply the gas into the cooking chamber to further pressurize the cooking chamber;
      compare an amount of time the pressure assist system has been active to a maximum allowable time to determine if the amount of time the exceeds the maximum allowable time; and
      in response to the amount of time exceeding the maximum allowable time, deactivate the pressure assist system.

2. The pressure fryer of claim 1 wherein the predetermined pressure is an optimal operating pressure, and the controller is further configured to:
   monitor the pressure in the cooking chamber after activating the pressure assist system; and
   deactivate the pressure assist system when the pressure within the cooking chamber is equal to or greater than the predetermined pressure.

3. The pressure fryer of claim 1 wherein the controller is further configured to:
   wait a predetermined amount of time after detecting closure of the pressure control valve to determine the pressure in the cooking chamber.

4. The pressure fryer of claim 3 wherein the predetermined pressure is a target pressure, and the controller is further configured to:
   determine an amount of gas to supply into the cooking chamber based on a difference between the pressure in the cooking chamber and the target pressure.

5. The pressure fryer of claim 4 wherein the amount of gas supplied into the cooking chamber is controlled by an amount of time the pressure assist system is activated, or a rate at which the pressure assist system supplies the gas.

6. The pressure fryer of claim 1 wherein the pressure assist system includes an air pump, and activating the pressure assist system comprises applying power to the air pump.

7. The pressure fryer of claim 1 wherein the pressure assist system includes a pressure supply valve coupling the cooking chamber to a pressure source, and activating the pressure assist system comprises opening the pressure supply valve.

8. The pressure fryer of claim 7 wherein the pressure source is a tank of pressurized carbon dioxide used to supply a fountain drink station.

9. The pressure fryer of claim 1 wherein the controller activates the pressure assist system to supply the gas into the cooking chamber by causing the pressure assist system to supply an amount of the gas into the cooking chamber so that the pressure in the cooking chamber follows a predetermined pressurization curve.

10. The pressure fryer of claim 9 wherein the controller adjusts the amount of gas supplied into the cooking chamber by cycling activation of the pressure assist system.

11. The pressure fryer of claim 9 wherein the predetermined pressurization curve duplicates a pressurization with respect to time that would normally occur with a full load of food product.

* * * * *